US011720378B2

(12) United States Patent
Rosenstein et al.

(10) Patent No.: US 11,720,378 B2
(45) Date of Patent: *Aug. 8, 2023

(54) SYSTEMS AND METHODS TO FACILITATE TASK-SPECIFIC WORKSPACES FOR A COLLABORATION WORK MANAGEMENT PLATFORM

(71) Applicant: Asana, Inc., San Francisco, CA (US)

(72) Inventors: Justin Rosenstein, San Francisco, CA (US); He Lu, San Francisco, CA (US); Alexandra Estrada, Salt Lake City, UT (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/408,030

(22) Filed: Aug. 20, 2021

(65) Prior Publication Data
US 2021/0382734 A1    Dec. 9, 2021

Related U.S. Application Data

(63) Continuation of application No. 15/908,670, filed on Apr. 2, 2018, now Pat. No. 11,138,021.

(51) Int. Cl.
*G06F 9/451* (2018.01)
*G06F 3/0481* (2022.01)
(Continued)

(52) U.S. Cl.
CPC ............ *G06F 9/451* (2018.02); *G06F 3/0481* (2013.01); *G06F 9/44505* (2013.01);
(Continued)

(58) Field of Classification Search
CPC .... G06F 9/451; G06F 3/0481; G06F 9/44505; G06Q 10/063114; G06Q 10/103; G09G 5/14
See application file for complete search history.

(56) References Cited

U.S. PATENT DOCUMENTS 5,233,687 A    8/1993 Henderson, Jr.
5,524,077 A    6/1996 Faaland
(Continued)

FOREIGN PATENT DOCUMENTS

CN    101305350 A    11/2008
CN    101563671 A    10/2009
(Continued)

OTHER PUBLICATIONS

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

(Continued)

*Primary Examiner* — Jennifer N Welch
*Assistant Examiner* — Reji Kartholy
(74) *Attorney, Agent, or Firm* — Esplin & Associates, PC

(57) ABSTRACT

Described herein are systems and methods to facilitate task-specific workspaces for a collaboration work management platform. Task-specific workspaces for individual ones of the users for individual ones of the tasks may be facilitated. Presentation of the first task and/or the first task-specific workspace for the first task for the first user may be effectuated. Information characterizing interactions of the first user with the first set of applications within the first task-specific workspace at or near a first time may be obtained and/or stored responsive to a pause and/or completion of the first task at the first time. The one or more windows corresponding to the first set of applications for the first task may be minimized and/or closed. Responsive to a re-start of the first task, the first set of applications may be restored based on the environment state information.

20 Claims, 6 Drawing Sheets

(51) Int. Cl.
  *G06F 9/445*     (2018.01)
  *G06Q 10/0631*   (2023.01)
  *G09G 5/14*      (2006.01)
  *G06Q 10/10*     (2023.01)

(52) U.S. Cl.
  CPC ... *G06Q 10/063114* (2013.01); *G06Q 10/103* (2013.01); *G09G 5/14* (2013.01)

(56) References Cited

U.S. PATENT DOCUMENTS

| | | |
|---|---|---|
| 5,530,861 A | 6/1996 | Diamant |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1* | 5/2002 | Togawa ............ G06F 21/6218 709/200 |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1* | 7/2012 | Yankovich ............ G06F 9/4451 715/810 |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,268,875 B2 | 2/2016 | Campbell |
| 9,350,560 B2 | 5/2016 | Hupfer |
| 9,367,117 B2 | 6/2016 | Timm |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,007,406 B1 | 6/2018 | Libin |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |

(56) References Cited

U.S. PATENT DOCUMENTS

| | | |
|---|---|---|
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0205616 A1 | 8/2008 | Teng |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1* | 10/2009 | Burkhart ............ G06F 9/451 718/100 |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0137235 A1 | 5/2012 | T S |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Artzt |
| 2014/0040905 A1 | 2/2014 | Tadanobu |
| 2014/0058801 A1 | 2/2014 | Deodhar |

(56) References Cited

U.S. PATENT DOCUMENTS

| | | |
|---|---|---|
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0348496 A1 | 12/2015 | Santos, II |
| 2015/0363092 A1 | 12/2015 | Morton |
| 2015/0363733 A1* | 12/2015 | Brown ............... G06Q 10/103 705/7.26 |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | Mcclement |
| 2016/0182311 A1 | 6/2016 | Borna |
| 2016/0188145 A1 | 6/2016 | Vida |
| 2016/0216854 A1 | 7/2016 | Mcclellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068403 A1* | 3/2017 | Ohsumi ............ G06Q 10/06316 |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0255455 A1 | 9/2017 | Collier |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1* | 3/2018 | Rosati ............ G06Q 10/063114 |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1* | 9/2018 | Beaudoin ............ G06F 3/04817 |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |

(56) References Cited

U.S. PATENT DOCUMENTS

| | | | |
|---|---|---|---|
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0225321 A1 | 7/2021 | Kogan |
| 2021/0232282 A1 | 7/2021 | Karpe |
| 2021/0320891 A1 | 10/2021 | Rosenstein |
| 2021/0342786 A1 | 11/2021 | Jiang |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |

FOREIGN PATENT DOCUMENTS

| | | | |
|---|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

Macro, computer science, wikipedia, archives org, 6 pages, Feb. 11, 2020 http://web.archive.org/web/20200211082902/https://en.wikipedia.org/wiki/Macro_(computer_science) (Year: 2020).

Creating Tables with Fields from 2 Different Tables, published: 2009, publisher: StackOverflow, pp. 1-2. (Year: 2009).

"Rules of Data Conversion from Document to Relational Databases", published: 2014, publisher: Future-processing, pp. 1-8 (Year: 2014).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https:// web.archive.org/web/20160101054527/https://asana.com/product) (Year: 2016) 15 pages.

"U.S. Appl. No. 14/584,750, Examiner Interview Summary dated Feb. 25, 2016", 3 pgs.

"U.S. Appl. No. 14/584,750, Non Final Office Action dated Aug. 28, 2015", 21 pgs.

"U.S. Appl. No. 14/584,750, Notice of Allowance dated Mar. 28, 2016", 8 pgs.

"U.S. Appl. No. 14/584,750, Response filed Feb. 29, 2015 to Non Final Office Action dated Aug. 28, 2015", 16 pgs.

"U.S. Appl. No. 14/584,850, Final Office Action dated Sep. 1, 2017", 31 pgs.

"U.S. Appl. No. 14/584,850, Non Final Office Action dated Jan. 10, 2017", 9 pgs.

"U.S. Appl. No. 14/584,850, Response filed Apr. 10, 2017 to Non Final Office Action dated Jan. 10, 2017", 13 pgs.

"How to Asana: Inviting teammates to Asana." YouTube, Asana, Mar. 21, 2017, https://www.youtube.com/watch?v=TLOruY1KyxU (Year: 2017), 13 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios,youtube,excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA&list=PLJFG93oi0wJAi UwyOhlGWHdtJzJrzylBv (Year: 2019) (1 page).

Asset, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Hartmann, "TimeProjectscheduling with resource capacities and requests varying with time: a case study," 2013, Flexible services and manufacturing journal, vol. 25, No. 1, pp. 74-93 (Year: 2013).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

(56) References Cited

OTHER PUBLICATIONS

Justin Rosenstein, Unveiling the Future of Asana, Mar. 28, 2018 https://www.youtube.com/watch?v=nRI?d_WM4Bc (Year: 2018) (2 pages).
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).
Paul Minors, How to automate your tasks, youtube excerpts, Oct. 18, 2019 https://www.youtube.com/watch?v=lwF9XyUQrzw (Year: 2019).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
www.cogmotive.com/blog/author/alan Alan Byrne: "Creating a company Shared Calendar in Office 365"; pp. 1-17; Sep. 10, 2013.
(Tiburca, Andrew) Best Team Calendar Applications for 2018-Toggl https://toggl.com/blog/best-team-calendar-applications-for-2018 (Year: 2017).
Dawei Li, "Deepcham: Collaborative Edge-Mediated Adaptive Deep Learning for Mobile Object Recognition", 2016, IEEE/ACM, pp. 64-76. (Year: 2016).

\* cited by examiner

SYSTEMS AND METHODS TO FACILITATE TASK-SPECIFIC WORKSPACES FOR A COLLABORATION WORK MANAGEMENT PLATFORM

FIELD

The disclosure relates to systems and methods to facilitate task-specific workspaces for a collaboration work management platform.

BACKGROUND

Generic computer interfaces offer few if any options for limiting distractions. Employees often lose time, efficiency, and/or focus because of interruptions, distractions, switching between tasks and losing their place/train of thought, etc. Existing interfaces fail to offer clean workspaces that enable a user to transition between tasks efficiently, without losing their work and/or place. Existing management platforms and/or interfaces often offer too many choices and/or options that make it difficult to actually get work done because users are overwhelmed and/or distracted by the interface.

SUMMARY

The disclosure relates to systems and methods configured to facilitate task-specific workspaces for a collaboration work management platform. The task-specific workspaces may provide a focused workspace in which users can work with fewer distractions. The applications and/or windows open within the task-specific workspace may be related to and/or used for working on a specific task such that users are not distracted by windows and/or applications that are unrelated to the task they are currently working on. When the users pause the task within the task specific workspace and/or switch tasks, the state of the task-specific workspace and/or the user's interactions with the windows and/or applications within the task-specific workspace may be saved. As such, the user may be able to return to where they left off within the task-specific workspace at a later time. By way of non-limiting example, if a user pauses a task within a task-specific workspace while working within a word document, an internet browser, and/or a presentation application, the state of the word document, the internet browser, and/or the presentation application may be saved such that when the user re-starts and/or re-selects the task, the applications and/or windows corresponding to the word document, the internet browser, and/or the presentation application automatically open. The applications and/or windows corresponding to the word document, internet browser, and/or presentation application may automatically open in the same arrangement and/or to the same section of the word document, internet webpage, and/or slide the user was working on at or near the time they paused the task and/or switched tasks.

The task-specific workspaces may takeover a desktop of a user. The user may be presented with one or more tasks (e.g., a task list, etc.) rather than all of the different applications and/or documents that are typically presented with existing desktops. This may clutter the desktop, overwhelm the user, and/or distract the user from the tasks they need to complete. Users often work from various different devices (e.g., multiple computers, mobile devices, etc.) having to save things locally and/or transfer them from one device to another. Task-specific workspaces automatically track and maintain the state of the workspace such they the user could pick up where they previously left off on the same device and/or across different devices. This reduces the need to save things locally on devices, eliminates extra steps of uploading saved documents to a file-share program and/or emailing saved documents, and solves the problems associated with lost time getting users up to speed and/or picking up where they left off.

The presentation of the collaboration environment may be based on environment state information. The storage component may be configured to effectuate storage of the environmental state information. The environmental state information may define the state of the collaboration environment. The state of the collaboration environment may comprise a user state, a project state, a task state, and/or or other states that make up the collaboration environment state. The environmental state information may include one or more records. The one or more records may include one or more user records, project records, task records, and/or other records. The user state may be defined by one or more of the user records. The user records may define values of user parameters associated with users interacting with, viewing, and/or able to interact with or view the collaboration environment. The project state may be defined by the project records. The project records may define values of project parameters for projects managed within the collaboration environment. The task state may be defined by the task record. The task record may define values of task parameters for tasks created and/or assigned within the collaboration environment.

In some implementations, a system configured to facilitate task-specific workspaces for a collaboration work management platform may include one or more of: one or more servers, one or more client computing platforms, and/or other components. The one or more servers may be configured to communicate with one or more client computing platforms according to a client/server architecture and/or other architecture. The one or more servers and/or client computing platforms may include one or more physical processors configured to execute one or more computer program components. The computer program components may include one or more of an environment state component, a collaboration environment component, a user task component, a desktop component, a workspace component, an application component, and/or other components.

The one or more client computing platform(s) may be configured to facilitate task-specific workspaces for individual ones of the users for individual tasks. The one or more tasks may include action items, to-do items, and/or objectives within a given project managed via the collaboration work management platform. The one or more tasks may be assigned to one or more users such that the one or more tasks assigned to a given user may appear on a given user's task list within the collaboration environment.

User task component may be configured to receive user input indicating selection of a first task. User task component may be configured to effectuate presentation of the first task for the first user. Presentation of the first task for the first user may be based on the environment state information. Responsive to the first user selecting the first task, the user task component may be configured to request information associated with the first task (e.g., a first user record, a first project record, a first task record, and/or other information) from the server. The server may effectuate transmission of the first user record, the first project record, the first task record, and/or other records over the network to the user task component.

In some implementations, desktop component may be configured to clear the current desktop of a given client computing platform. The desktop may be cleared to initiate a clean workspace (e.g., a first task-specific workspace) for the first task.

The workspace component may be configured to effectuate presentation of the first task-specific workspace for the first task. In some implementations, a first set of applications may be accessible by the first user via the first task-specific workspace. The first set of applications may have one or more corresponding windows through which the first user interacts with the first set of applications. The first user may work on the first task using one or more applications in the first set of applications.

The workspace component may be configured to block and/or restrict one or more applications within the task-specific workspace. As such, one or more other applications generally available via the first client computing platform outside of the task-specific workspace, may not accessible within the first task-specific workspace.

The workspace component may be configured to receive user input indicating a pause and/or completion of the first task at a first time. By way of example, a pause of the first task may be indicated by switching to a second task and/or another task. The application component may be configured to obtain information characterizing interactions of the users with the applications within the task-specific workspaces at or near the time the task is paused. In some implementations, the application component may be configured to obtain information characterizing interactions of the first user with the first set of applications within the first task-specific workspace at or near the first time. The interactions may include, for example, information indicating which applications the user had open, which webpage(s) and/or file(s) the user had open, the application and/or document titles the user was working on and/or had open, progress information characterizing progress of the first user within the first set of applications (e.g., where the user left off in one or more webpages and/or files), and/or on the first task (e.g., the user paused the task when 60% completed), an amount of time spent on active applications and/or webpages, and/or other interactions.

The application component may be configured to store the information characterizing the interactions of the first user with the first set of applications at or near the first time. The information characterizing the interactions of the first user with the first set of applications at or near the first time may be stored as part of a first user record and/or a first task record. The workspace component may be configured to minimize and/or close the one or more windows corresponding to the first set of applications for the first task responsive to the receiving the user input indicating the first task is paused and/or completed.

Responsive to a user re-opening and/or re-starting the first task and/or the first task-specific workspace, the workspace component may be configured to restore the first set of applications based on the environment state information. The first set of applications and/or the one or more windows corresponding to the first set of applications may be restored (e.g., re-opened, re-arranged, reverted, etc.) based on the first user record and/or the first task record.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
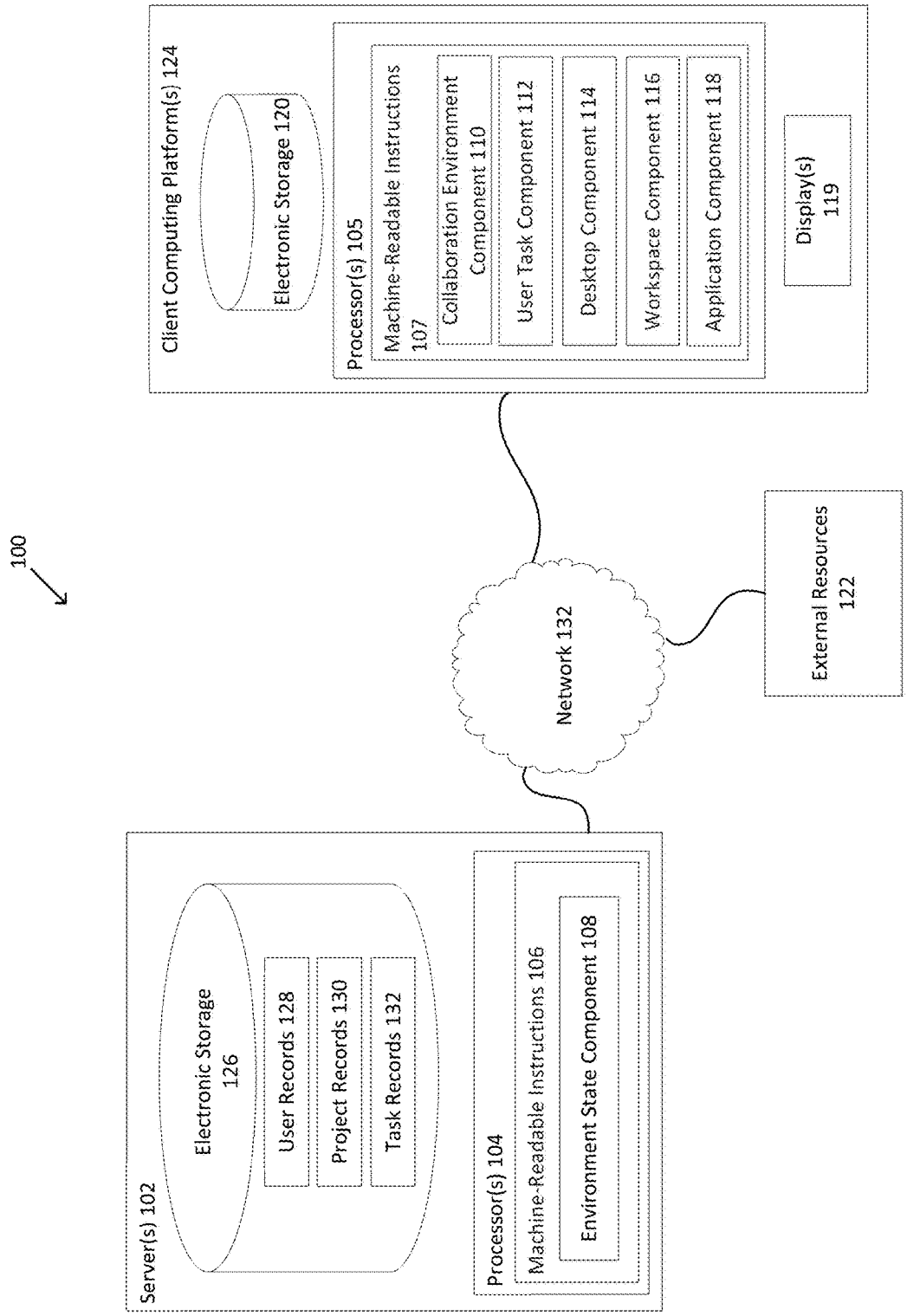
FIG. 1 illustrates a system configured to facilitate task-specific workspaces for a collaboration work management platform, in accordance with one or more implementations.

FIG. 1 illustrates a system 100 configured to facilitate task-specific workspaces for a collaboration work management platform, in accordance with one or more implementations. In some implementations, system 100 may be configured to effectuate presentation of a collaboration environment based on environment state information. Users may view and/or interact with the collaboration environment. One or more projects may be managed within the collaboration environment. One more tasks may be created and/or assigned to one or more users within the collaboration environment.

The presentation of the collaboration environment may be based on environment state information. The environment state information may include user records 128, project records 130, task records 132, and/or other records. The environment state information may be continuously generated and/or updated based on the state of the collaboration environment representing the users' interactions with the collaboration environment. The state of the collaboration environment may include a user state, a project state, a task state, and/or other states. The user state may be defined by user records 128. User records 128 may define values of user parameters associated with users interacting with and/or viewing the collaboration environment. The project state may be defined by project records 130. Project records 130 may define values of project parameters for projects managed within the collaboration environment. The task state may be defined by task records 132. Task records 132 may define values of task parameters for tasks created and/or assigned within the collaboration environment.

The user parameters associated with the users interacting with and/or viewing the collaboration environment may include parameters describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The user parameters may, by way of non-limiting example, include one or more of: a user name, a user role, a user department, descriptive user content, a to-email, a from-email, a photo, an organization, a workspace, one or more projects (which may include project parameters defined by one or more project records); one or more tasks (which may include one or more task parameters defined by one or more task records), one or more user comments, one or more teams the user belongs to, one or more of the user display settings (e.g., colors, size, project order, task order, etc.), one or more authorized applications, one or more presence/interaction parameters (e.g., indicating presence and/or interaction level at an environment level, project level, task all, application level, etc.), one or more notification settings, one or more progress parameters, status information for one or more tasks the user is associated with, one or more statistics related to a given user (e.g., how many tasks the user has completed, how quickly the user completed the tasks, the efficiency of the user, bandwidth of the user, activity level of the user, etc.), application access information (e.g., username/password for one or more third-party applications), one or more favorites and/or priorities, other user parameters for the given user, and/or other user parameters, project parameters, and/or task parameters for one or more projects and/or tasks the given user is associated with.

The project parameters for projects managed within the collaboration environment may include parameters describing one or more projects managed within the collaboration environment and/or via the collaboration work management platform, and/or the metadata associated with the one or more projects. Individual ones of the projects may be associated with individual ones of the project records. A project record may define values of the project parameters associated with a given project managed within the collaboration environment and/or via the collaboration work management platform. A given project may have one or more owners and/or one or more team members working on the given project. The given project may include one or more tasks assigned to one or more users under the given project heading.

The project parameters may, by way of non-limiting example, include one or more of: one or more tasks within individual ones of the projects (which may include task parameters defined by one or more task records), one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project members (e.g., an owner, one or more other project members, member access information, and/or other project members and/or member information), a status and/or progress (e.g., an update, a hardcoded status update, a measured status, quantity of tasks remaining in a given project, completed tasks in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of tasks within the given project, state of a workspace for a given task within the given project, other project parameters for the given project, and/or other project parameters, user parameters, and/or task parameters for one or more users and/or tasks the given project is associated with.

The task parameters for tasks within the collaboration environment may include parameters describing one or more tasks created and/or assigned within the collaboration environment and/or via the collaboration work management platform, and/or the metadata associated with the one or more tasks. Individual ones of the tasks may be associated with individual ones of the tasks records. A task record may define values of the task parameters associated with a given task created and/or assigned within the collaboration environment and or via the collaboration work management platform. The tasks make include one or more to-do items, action items, objectives, and/or other tasks one or more users should and/or plan on accomplishing. Tasks may be created by a given user for the given user and/or created by the given user and assigned to one or more other users.

The task parameters may, by way of non-limiting example, include one or more of: a task name, a task a description, a task status (e.g., complete, incomplete, and/or another status), an assignee, one or more followers, one or more team members, one or more task dates (e.g., a start date, a completion date, a due date, and/or other dates), one or more user comment parameters (e.g., a creator, a recipient, one or more followers, one or more other interested parties, content, one or more times, upvotes, other hard-coded responses, etc.), task upvotes, other hard-coded task responses, one or more tags, one or more custom fields (e.g., priority, cost, stages, and/or other custom fields), one or more dependencies (e.g., tasks dependent on, dependent tasks. Users assigned to dependent tasks, notification settings for dependent tasks, and/or other dependencies), a task URL, one or more subtasks and/or subtask parameters (e.g., name, description, hardcoded status, assignees, due date, state date, comments, upvotes, tags, and/or other subtask parameters), one or more attachments, one or more interaction parameters (e.g., sources of the interactions, context of the interactions, content of the interactions, time for the interactions, and/or other interaction parameters), state of a workspace for a given task (e.g., application state parameters, application status, application interactions, user information, and/or other parameters related to the state of the workspace for a given task), other task parameters for the given task, and/or other task parameters, user parameters, and/or project parameters for one or more users and/or project(s) the given task is associated with.

It is noted that any metadata and/or values of parameters related to any users, projects, and/or tasks may be considered values of user parameters, project parameters, and/or task parameters. The terms "user parameters", "project parameters", and/or "task parameters" may be used interchangeably herein.

As is illustrated in FIG. 1, system 100 may include one or more of: one or more servers 102, one or more client computing platforms 124, external resources 122, and/or other components. Users may interact with system 100 via one or more client computing platforms 124. The one or more servers 102 may be configured to communicate with one or more client computing platforms 124 according to a client/server architecture and/or other communication schemes. The one or more client computing platforms 124 may include one or more of a cellular telephone, a smartphone, a digital camera, a laptop, a tablet computer, a desktop computer, a television set-top box, smart TV, a gaming console, and/or other client computing platforms.

The one or more servers 102 may include one or more physical processors 104 and/or physical processors 105 (also referred to herein as "one or more processors" and/or "processor(s)"), non-transitory electronic storage 126, and/or other components. Non-transitory electronic storage 126 may include one or more records. The one or more records may store the environment state information that defines the state of the collaboration environment. The state of the collaboration environment may include a user state, a project state, a task state, and/or other states. The records may include user records 128, project records 130, task records 132, and/or other records. The one or more physical processors 104 may be configured to access one or more of user records 128, project records 130, task records 132, and/or other records to effectuate transmission of the environment state information over network 132 to client computing platform(s) 124. Client computing platform(s) 124 may use the environment state information to effectuate presentation of the collaboration environment via client computing platform(s) 124. The one or more physical processors 104 and/or physical processors 105 may be configured to execute machine-readable instructions 106 and/or machine-readable instructions 107. The machine-readable instructions 106 may include one or more computer program components. The computer program components may include one or more of an environment state component 108, a collaboration environment component 110, a user task component 112, a desktop component 114, a workspace component 116, an application component 118, a and/or other components.

In some implementations, server(s) 102 may be configured to provide remote hosting of the features and/or functions of machine-readable instructions 106 to one or more client computing platform(s) 124 that may be remotely located from server(s) 102. In some implementations, one or more features and/or functions of server(s) 102 may be attributed as local features and/or functions of one or more client computing platform(s) 124. For example, individual ones of the client computing platform(s) 124 may include one or more additional machine-readable instructions 107 comprising the same or similar components as machine-readable instructions 106 of server(s) 102. The client computing platform(s) 124 may be configured to locally execute the one or more components that may be the same or similar to the machine-readable instructions 106. One or more features and/or functions of machine-readable instructions 106 of server(s) 102 may be provided, at least in part, as an application program that may be executed at a given client computing platform 124. One or more features and/or functions of machine-readable instructions 107 may be provided, at least in part, at a server(s) 102.

The electronic storage 126 may include electronic storage media that electronically stores information. The electronic storage media of electronic storage 126 may include one or both of system storage that is provided integrally (i.e., substantially non-removable) with one or more servers 102 and/or removable storage that is removably connected to one or more servers 102. The connection may be facilitated by, for example, a port (e.g., a USB port, a firewire port, etc.) or a drive (e.g., a disk drive, etc.). The electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126 may include one or more virtual storage resources (e.g., cloud storage, a virtual private network, and/or other virtual storage resources). The electronic storage 126 may store software algorithms, information determined by processor(s) 104, information received by one or more servers 102, information received by client computing platforms 124, and/or other information that enables one or more servers 102 to function as described herein.

The electronic storage 126 may be configured to store one or more records and/or information. The one or more records may include one or more of user records 128, project records 130, task records 132, and/or other records.

The one or more records (e.g., user records 128, project records 130, task records 132, and/or other records) may specify and or define values for one or more user parameters, project parameters, and/or other parameters for the collaboration environment. The one or more records may specify correspondences between one or more of the user records 128, project records 130, task records 132, and/or other records. The correspondences may be used to determine which user parameters and/or values, project parameters and/or values, and/or task parameters and/or values are associated with a given user, project, and/or task within the collaboration environment.

The client computing platform(s) 124 may monitor, and/or collect information for transmission to the one or more server(s) 102 to be stored as environment state information. The client computing platform(s) 124 may obtain and/or collect environment state information from the one or more server(s) 102.

The environment state component 108 of machine-readable instructions 106 may be configured to effectuate transmission of the environment state information to client computing platform(s) 124, and/or vice versa. In some implementations, environment state component 108 may be configured to receive information over network 132 from client computing platforms(s) 124. Environment state component 108 may be configured to effectuate storage of the received information as environment state information to one or more user records 128, project records 130, task records 132, and/or other records. Environment state component 108 may be configured to obtain one or more user records 128, project records 130, task records 132, and/or other records in response to and/or based on one or more requests from client computing platform(s) 124. Environment state component 108 may be configured to effectuate transmission of values for user parameters, values for project parameters, values for task parameters, and/or other state information to client computing platform(s) 124. The values for user parameters, values for project parameters, values for task parameters, and/or other state information may be used to effectuate presentation of the relevant tasks and/or projects for a given user of the collaboration environment associated with the given client computing platform 124 to which the values and/or other state information is transmitted.

Collaboration environment component 110 of machine-readable instructions 107 may be configured to effectuate presentation of a collaboration environment. Presentation of the collaboration environment may be based on environment state information. The environment state information may include user records, project records, task records, and/or other records. The environment state information may define a state of the collaboration environment. The state of the collaboration environment may include a user state, a project state, a task state, and/or other states. The user state may be defined by the user records. The user records may define values of user parameters associated with users interacting with and/or viewing the collaboration environment. The project state may be defined by the project records. The project records may define values of project parameters for projects managed within the collaboration environment. The task state may be defined by the task records. The task records may define values of task parameters for tasks created and/or assigned within the collaboration environment.

The client computing platform(s) 124 may effectuate presentation of the collaboration environment. The collaboration environment may include the environment in which users interact with and/or view the one or more tasks and/or projects managed via the collaboration work management platform. The collaboration environment may exist whether or not a given user is viewing and/or interacting with the collaboration environment. In some implementations, projects managed vie the collaboration environment may include one or more tasks. By way of non-limiting example, the one or more tasks may include action items, to-do items, and/or objectives within a given project. The one or more tasks may be assigned to one or more users such that the one or more tasks assigned to a given user may appear on a given user's task list within the collaboration environment. The one or more client computing platform(s) 124 may be configured to facilitate task-specific workspaces for individual ones of the users for individual ones of the tasks.

User task component 112 may be configured to receive user input indicating selection of a task. In some implementations, wherein a first task-specific workspace is facilitated for a first user on a first client computing platform, the user input may indicate selection of a first task. User input may include any input and/or indication by a user to start and/or work on the first task. In some implementations, user task component 112 may effectuate presentation of multiple tasks associated with the first user (e.g., assigned to the first user). User task component 112 may be configured to obtain user input indicating a selection of the first task from the multiple tasks.

In some implementations, user task component 112 may be configured to determine a recommended task (e.g., which task a user should work on) based on the environment state information. The recommended task may be determined, for example, based on the due date, one or more dependencies of the recommended tasks, efficiency and/or time information associated with the given user and/or task (e.g., it is 3 pm and task one is predicted to take the user 2 hours to complete while task two is predicted to take the user 4 hours to complete, the first task may be recommended if, for example, the user typically becomes inactive in the collaboration environment after 5:00 p.m.), one or more other tasks associated with the given user (e.g., the user has 4 other tasks due tomorrow), and/or other information.

In some implementations, user task component 112 may be configured to determine and/or effectuate presentation of one or more recommended applications, documents, updates, and/or other information for working on the first task. The one or more recommended applications, documents, updates, and/or other information may be presented and/or determined responsive to receiving user input indicating selection of the first task. The one or more recommended applications may be determined based on user information (e.g., historical user information, user preferences, etc.); task information (e.g., a type of task, the task title, the task due date, etc.); generated work, documents, applications used, and/or other information from one or more dependent tasks, similar tasks, associated tasks, and/or tasks that are otherwise linked to task; one or more updates, interactions, and/or events within a given task, project, and/or task-specific workspace; and/or one or more updates, interactions, and/or events within a given task, project, task-specific workspace that occurred while the given user was not in the task-specific workspace and/or working on the given task, and/or other information. The one or more documents, updates, and/or other information may be determined based on other generated work, documents, applications, and/or other information from one or more dependent tasks, similar tasks, associated tasks, and/or tasks that are otherwise linked. In some implementations, user task component 112 may be configured to determine and/or effectuate presentation of one or more recommended applications, documents, updates, and/or other information based on one or more updates, interactions, and/or events within a given task, project, and/or task-specific workspace that occurred while the given user was not in the task-specific workspace and/or working on the given task. As such, the state of a given task-specific workspace may be maintained while a user is not working on the given task and/or within the given task-specific workspace.

User task component 112 may be configured to effectuate presentation of the first task for the first user based on the environment state information. Responsive to the first user selecting the first task, user task component 112 may be configured to request information associated with the first task from environment state component 108. Information associated with the first task may include user state information associated with the first user (e.g., the first user record), project state information associated with a first project (e.g., the first project record) under which the first task may be assigned to the first user, task state information associated with the first task (e.g., the first task record), and/or other information. User task component 112 may be configured to receive the environment state information associated with the first task such that the first task may be presented to the first user.

In some implementations, desktop component 114 may be configured to clear the current desktop of a given client computing platform 124. Desktop component 114 may be configured to clear the current desktop to initiate the first task-specific workspace for the first task. The current desktop may be cleared by minimizing and/or closing one or more open applications and/or windows displayed on the current desktop. Desktop component 114 may be configured to clear the current desktop responsive to the current desktop including one or more open applications or windows, and/or responsive to user task component 112 receiving user input receiving user input indicating selection of a first task.

Workspace component 116 may be configured to effectuate presentation of the first task-specific workspace for the first task. In some implementations, the first task specific workspace may include a task header bar including one or more of a task name and/or an indication of the first task that the user is working on within the first task-specific workspace, a project the task is associated with, a due date, a timer button (e.g., for timing how long a user works on a given task), a status button (e.g., for indicating when a task is complete), a chat and/or message button (e.g., for initiating a comment and/or chat session re the first task, and/or other information.

One or more applications may be available via the task-specific workspace. The user may use the one or more applications while working on the given task associated with the task-specific workspace. By way of non-limiting example, the applications may include: one or more internet applications (e.g., Internet Explorer, Chrome, etc.), one or more document applications (e.g., Microsoft Word, Pages, Adobe Acrobat, Writer, etc.), one or more presentation applications (e.g., PowerPoint, Keynote, etc.), one or more email applications (e.g., Outlook, Gmail, Yahoo mail, etc.), one or more messaging applications (e.g., Slack, Skype, etc.), one or more spreadsheet applications (e.g., Excel, Numbers, etc.), one or more photo/video applications (e.g., photoshop, iPhoto, iMovie, Adobe, Vegas Pro, etc.), and/or other applications (e.g., Genome browser, etc.). In some implementations, a first set of applications may be accessible via the first task-specific workspace. The first set of applications may have one or more corresponding windows through which the first user interacts with the first set of applications.

The first set of applications may comprise the available applications within the first task-specific workspace. In some implementations, the first set of applications may not include all of the applications accessible via the first-task specific workspace. As such, one or more applications in addition to those from the first set of applications may and/or may not be accessible within the first task-specific workspace. In some implementations, the first set of applications may include one or more applications the first user interacts with while working on the first task within the first task specific workspace.

In some implementations, one or more other applications generally available via the first client computing platform outside of the task-specific workspace may not be accessible within the first task-specific workspace. Workspace component 116 may be configured to block and/or restrict one or more applications. In some implementations, workspace component 116 may be configured to determine one or more other applications that are not accessible within the first task-specific workspace. Workspace component 116 may be configured to determine which applications are not accessible based on one or more values for one or more of the user parameters, the project parameters, the task parameters, and/or other parameters indicating the one or more other applications are restricted while the first user is working on the first task via the first task specific workspace. In some implementations, the user parameters, project parameters, task parameters, and/or other parameters indicating the one or more other restricted applications may include task settings and/or user settings indicating which applications to restrict and/or make available for the first task-specific workspace. In some implementations, a user (e.g., the first user, a project and/or task owner, etc.) may determine the user settings.

Workspace component 116 may be configured to receive user input indicating a pause and/or completion of the first task at a first time. The user input may be received via a pause button within the task-specific workspace. In some implementations, wherein the task-specific workspace has an integrated timer, pausing a task may cause the timer to pause. User input indicating a pause and/or completion of the first task may include switching from one task to another (e.g., via selecting another task). In some implementations, the user input indicating a pause of the first task at the first time may include a selection of a second task.

Application component 118 may be configured to obtain information characterizing interactions of the users with the applications within the task-specific workspaces at or near the time the task is paused. In some implementations, application component 118 may be configured to obtain information characterizing interactions of the first user with the first set of applications within the first task-specific workspace at or near the first time. Interactions of the first user with the first set of applications within the first task-specific workspace may include, for example, one or more of information indicating which applications the user had open; which webpages, documents, and/or files the user had open; the application and/or document titles the user was working on and/or had open; progress information characterizing progress of the first user within the first set of applications (e.g., where the user left off in one or more webpages and/or files) and/or on the first task (e.g., the user paused the task when 60% completed), an amount of time spent on active applications, documents, and/or webpages; and/or other interactions. In some implementations, application component 118 may be configured to monitor interactions of the first user with the first set of applications within the first task-specific workspace. The interactions may be monitored until the first time such that the state of the first set of applications at the first time may be obtained.

Application component 118 may be configured to store the information characterizing the interactions of the first user with the first set of applications at or near the first time as part of a first user record and/or a first task record. In some implementations, application component 118 may be configured to effectuate transmission of the first user record and/or the first task record over network 132 to environment state component 108 to store as part of one or more user records 128 and/or task records 132 in electronic storage 126.

Returning to workspace component 116, workspace component 116 may be configured to minimize and/or close the one or more windows corresponding to the first set of applications for the first task. In some implementations, responsive to receiving the user input indicating the pause and/or the completion of the first task, workspace component 116 may be configured to effectuate presentation of an option to save and/or store the first task-specific workspace and/or the interactions of the first user with the first set of applications within the first task-specific workspace. In some implementations, the first-task specific workspace and/or the interactions of the first user with the first set of applications within the first task-specific workspace may be automatically stored responsive to the user pausing the first task, switching tasks, completing the first task and/or otherwise indicating a pause of the first task. In some implementations, workspace component 116 may effectuate presentation of an option to save the task-specific workspace responsive to the user indication the status of the task-specific workspace is complete (e.g., the user changing the status from incomplete to complete).

In some implementations, responsive to receiving the user input indicating the pause and/or the completion of the first task, workspace component 116 may be configured to effectuate presentation of an option to send a notification based on progress of the first user in the first task to one or more interested parties. The one or more interested parties may be defined by the environment state information. By way of non-limiting example, when the user input indicates the first task is paused (e.g., the user pauses the task and/or switches tasks) and/or completed, workspace component 116 may be configured to effectuate presentation of an option to send a notification indicating the status and/or progress of the task to one or more followers, team-members, dependent task assignees, project owners, dependent task followers and/or team members, and/or other interested parties.

Workspace component 116 may be configured to restore one of more applications based on the state information responsive to a user re-opining and/or re-starting a task and/or a task-specific workspace. In some implementations, workspace component may be configured to restore the first set of applications based on the environment state information. The first set of applications may be restored by workspace component 116 responsive to receiving information indicating re-selection of the first task and/or a re-start of the first task. The first set of applications and/or the one or more windows corresponding to the first set of applications may be restored based on the first user record and/or the first task record. As such, for example, the first user may be able to pick up working on the first task where he or she left off (e.g., with the correct applications open, on the right page, etc.).

Re-selecting and/or re-starting a given task may include initiating start of a given task after a user has previously worked on the given task within the given task-specific workspace. In some implementations, the same user and/or a different user may re-start and/or re-select the given task. A different user may re-select and/or re-start the given task and/or the given task-specific workspace even if the user has not previously worked on the given task within the given workspace. In some implementations, if a first user selects and/or initiates the given task-specific workspace, a second user may re-select and/or re-start the given task and/or the given task-specific workspace (e.g., even though the second user may and/or may not have previously worked on the given task and/or within the given task-specific workspace).

In some implementations, the task-specific workspace may be associated with and/or assigned to a given task (instead of an/or in addition to a given user). As such, the task-specific workspace may be transferable such that another user may be able to pick up working on the task where the first user left off. As such, tasks may be re-assigned and/or transferred to other users without losing progress on the task.

Restoring the first set of applications may include un-minimizing and/or opening the one or more windows corresponding to individual ones of the first set of applications the first user was working on at and/or near the first time. In some implementations, restoring the first set of applications may include un-minimizing, re-opening, arranging, closing, minimizing but opening to the correct page, and/or otherwise restoring the first set of applications and/or corresponding windows to the state they were in at or near the first time. Such that, by way of non-limiting example, responsive to the first user only interacting with one application within the first set of applications at the first time, the one application and/or corresponding window may be restored (e.g., un-minimized, re-opened, closed, minimized but open to the correct page, and/or otherwise restored to the state it was in at or near the first time) when the first user returns to the first task-specific workspace.

By way of non-limiting example, responsive to the first user interacting with six different applications (four active and two minimized) within the first set of applications at the first time, the four active applications and/or corresponding window may be restored (e.g., un-minimized, re-opened, open to the correct page, and/or otherwise restored to the state they were in at or near the first time) and the two minimized applications and/or corresponding window may be restored (e.g., minimized but loaded to the correct page/location, and/or otherwise restored to the state they were in at or near the first time) when the first user returns to the first task-specific workspace.

In some implementations, responsive to a user re-starting and/or re-initiating a given task from a different computer than used to previously interact with the task-specific workspace for the given task, restoring one or more of the applications in a given set of applications may include identifying one or more corresponding applications that are similar to the applications previously used within the task specific workspace and/or restoring the one or more corresponding applications. By way of non-limiting example, if the first task-specific workspace is first presented on a first computer and all of the applications within first set of applications are not available on a second computer used to re-start and/or re-initiate the first task, one or more corresponding applications may be restored based on the first environment state information responsive to a given user re-selecting and/or re-starting the first task via the second computer. The one or more corresponding applications may perform the same and/or similar functions as the one or more applications to which they correspond.

By way of non-limiting example, if the first computer is an Apple computer, the second computer is a PC, and/or one of the applications in the first set of applications is Safari, the corresponding application may include google Chrome on the second computer. In some implementations, user preferences may be taken into account to determine one or more corresponding applications to recommend to a given user. By way of non-limiting example, responsive to internet explorer being present on the first computer and/or both internet explorer and Chrome being present on the second computer, workspace component 116 may determine Chrome should be recommended (e.g., based on the user records, user preferences, etc.) responsive to a given user re-selecting and/or re-starting the first task via the second computer.

In some implementations, workspace component 116 may be configured to restore one of more applications based on the state information including one or more interactions and/or updates that occurred while that first user was not working on the first task and/or within the first task-specific workspace. Other users may interact with the first task and/or the first task specific workspace while the first user is not. As such, by way of non-limiting example, if a second user worked on the first task after the first user paused the first task, the interactions and/or progress of the second user on the first task and/or within the first task-specific workspace may be captured within the state information such that when restored by the first user, the interactions and/or progress of the second user may be reflected. In some implementations, the state of the first task and/or the first task-specific workspace may be updated based on user interactions, updates and/or work product by one or more other users and/or interactions, updates, and/or work product from one or more related tasks (e.g., dependent tasks, etc.), projects, and/or other information.

In some implementations, task-specific workspace may include a group workspace that is updated and/or restored according to the state information reflecting interactions and/or progress of one or more users in the group. By way of non-limiting example, some interactions, applications, and/or progress may be user-specific such that the task-specific workspace tracks the state of the task-specific workspace as a whole and/or for individual users within the group of users.

In some implementations, responsive to a user switching from a first task to a second task, workspace component 116 may be configured to effectuate presentation of a second task-specific workspace. User task component 112 may be configured to receive user input indicating selection of the second task. The second task may be another task assigned to the first user and/or presented to the first user via the collaboration environment. User task component 112 may effectuate presentation of the second task for the first user based on the environment state information.

Workspace component 116 may be configured to effectuate presentation of a second task-specific workspace for the second task. A second set of applications may be accessible via the second task-specific workspace. The second set of applications may have one or more corresponding windows through which the first user interacts with the second set of applications. One or more applications in the second set of applications may be different than the applications in the first set of applications.

Workspace component 116 may be configured to receive user input indicating a pause and/or completion of the second task, and/or a re-selection of the first task and/or another task at a second time. Application component 118 may be configured to obtain information characterizing interactions of the first user with the second set of applications within the second task-specific workspace at or near the second time.

Application component 118 may be configured to store the information characterizing the interactions of the first user with the second set of applications at or near the second time as a second user record and/or a second task record. Workspace component 116 may be configured to minimize and/or close the one or more windows corresponding to the second set of applications for the second task.

Workspace component 116 may be configured to restore the second set of applications based on the environment state information. The second set of applications may be restored responsive to responsive to receiving information indicating re-selection of the first task and/or another task, and/or pausing of the second task. The one or more windows corresponding to the second set of applications may be restored based on the second user record and/or the second task record.

Figure 2A:
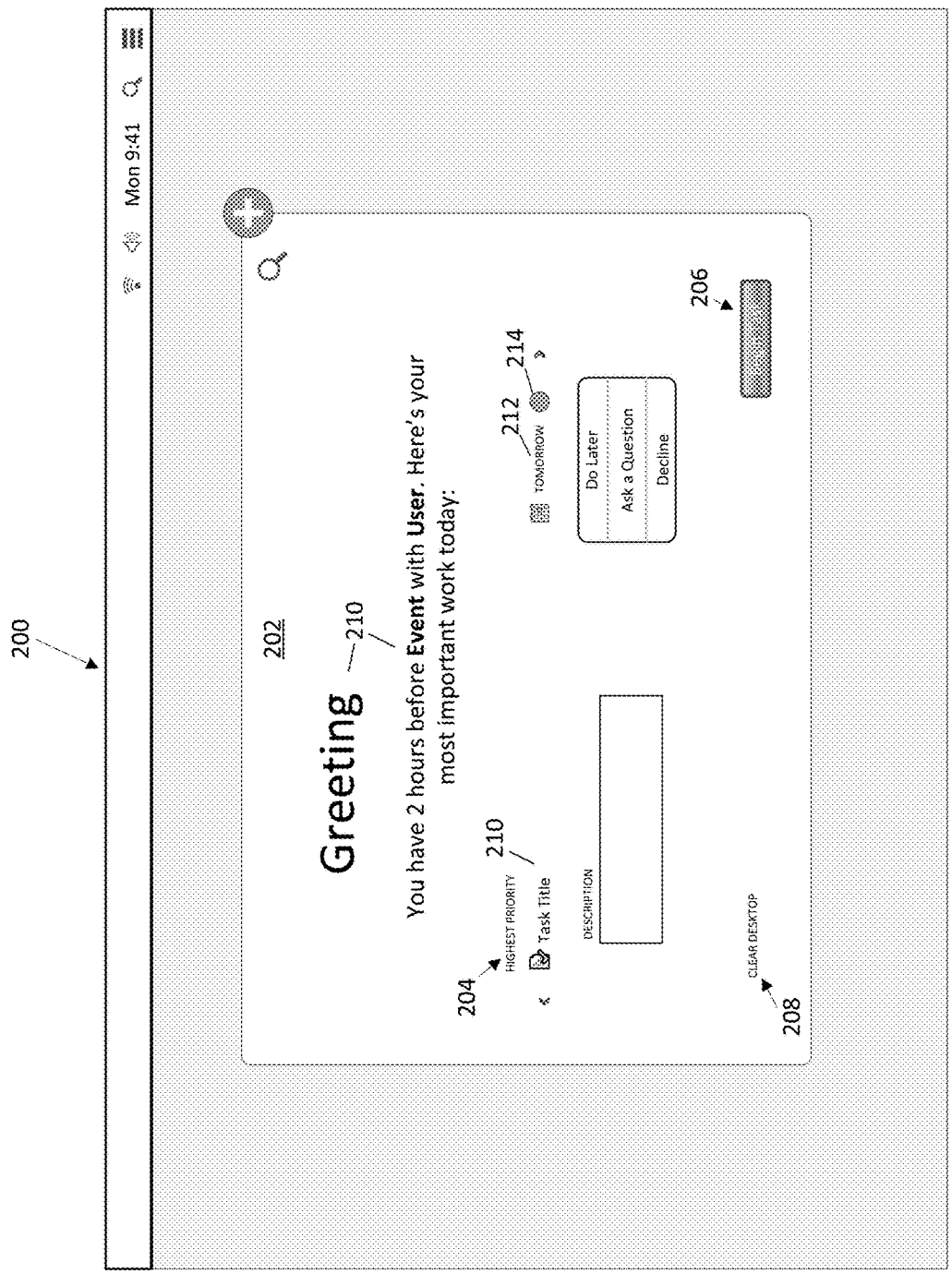
FIG. 2A illustrates an exemplary graphical user interface for initiating a task-specific workspace, in accordance with one or more implementations.

By way of non-limiting illustration, FIG. 2A illustrates an exemplary graphical user interface for initiating a task-specific workspace, in accordance with one or more implementations. Desktop 200 may be presented via a client computing platform the same as or similar to one of client computing platform(s) 124. Desktop 200 may include graphical user interface (GUI) 202. GUI 202 may be configured to effectuate presentation of task 210 to which the user is assigned. GUI 202 may present a greeting 201, description of task 210, due date 212, assignee 214, and/or other information associated with task 210. Greeting 210 may welcome the user and/or indicate how much time the user has to work on task 210. In some implementations, one or more other tasks may be presented in addition to task 210. By way of non-limiting example, task 210 may be a highest priority task indicated by a high priority field 204 based on it having a higher priority than the three other tasks assigned to the user, an earlier due date, one or more dependent tasks, and/or other information. GUI 202 may be presented to the user in order to initiate a task-specific workspace. Responsive to the user clicking on button 206 to begin task 210, a task-specific workspace for task 210 may be initiated.

Figure 2B:
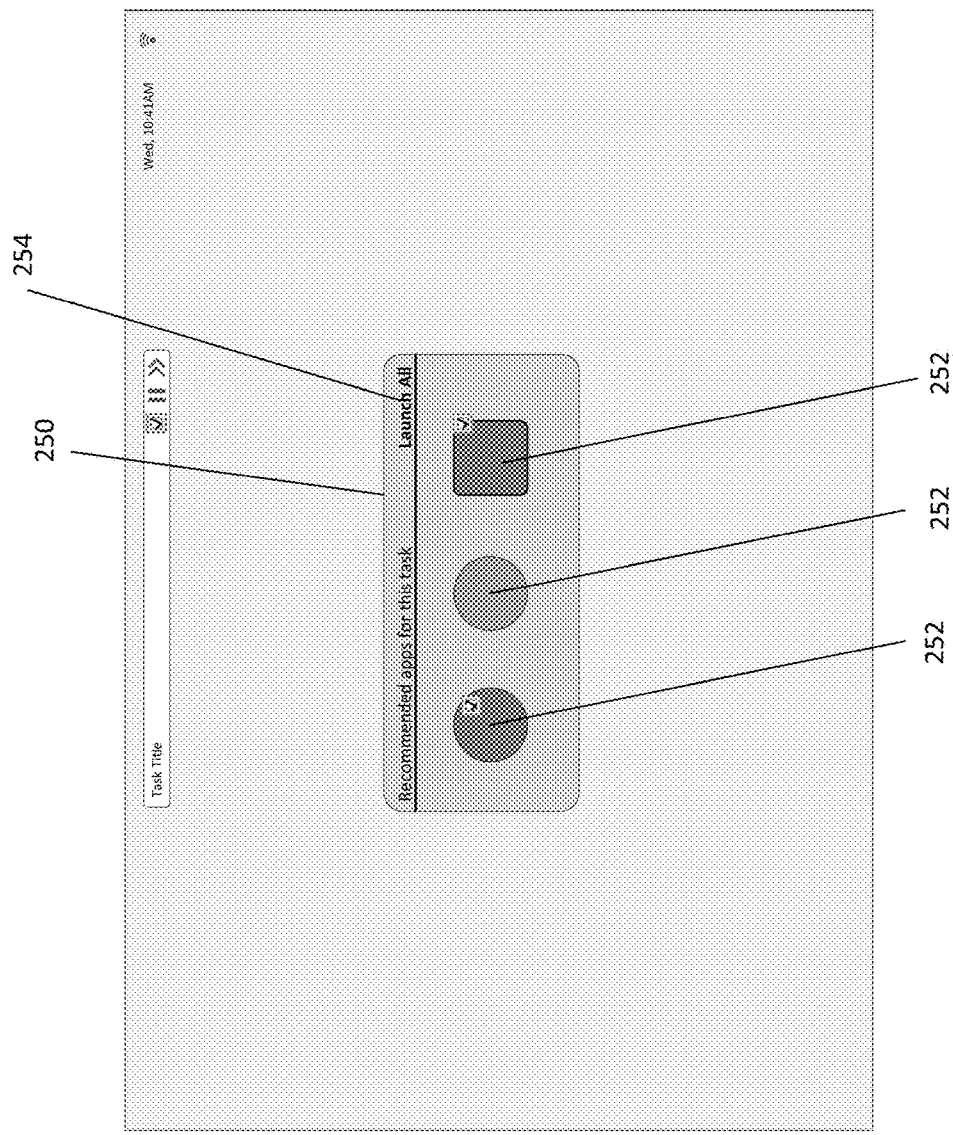
FIG. 2B illustrates an exemplary application recommendation interface for a task-specific workspace, in accordance with one or more implementations.

By way of non-limiting illustration, FIG. 2B illustrates an exemplary application recommendation interface for a task-specific workspace, in accordance with one or more implementations. In some implementations, application recommendation interface 250 may present one or more recommended applications 252 for task 210 responsive to the user selecting and/or initiating work on task 210. Application recommendation interface 250 may include a "launch all" button 254 that enables the user to launch all of recommended applications 252. By way of non-limiting example, one or more of recommended applications 252 may be determined based on user information (e.g., historical user information, user preferences, etc.); task information (e.g., a type of task, the task title, the task due date, etc.); generated work, documents, applications used, and/or other information from one or more dependent tasks, similar tasks, associated tasks, and/or tasks that are otherwise linked to task 210; one or more updates, interactions, and/or events within a given task, project, and/or task-specific workspace; and/or one or more updates, interactions, and/or events within a given task, project, task-specific workspace that occurred while the given user was not in the task-specific workspace and/or working on the given task, and/or other information.

Figure 2C:
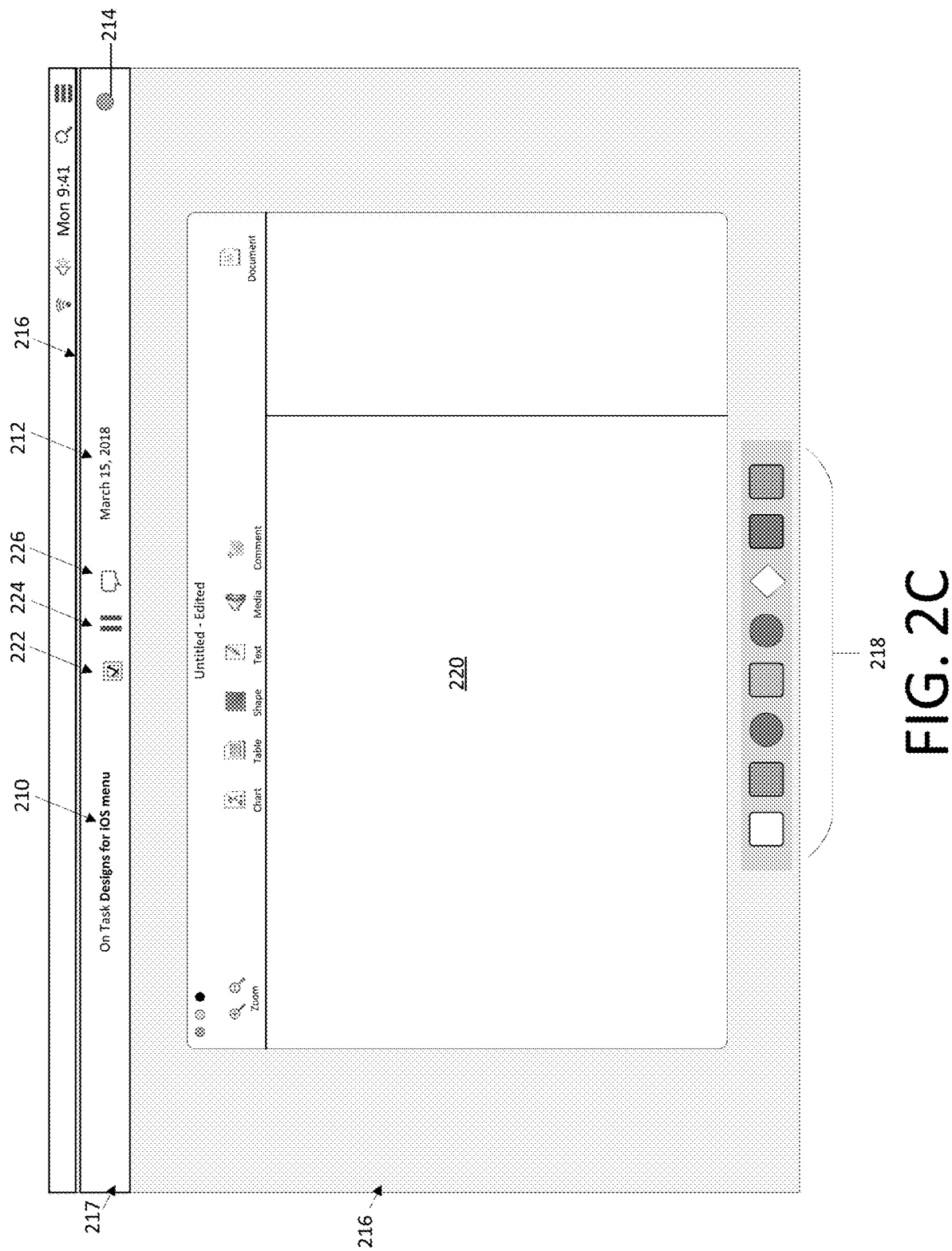
FIG. 2C illustrates an exemplary task-specific workspace, in accordance with one or more implementations.

By way of non-limiting illustration, FIG. 2C illustrates an exemplary task-specific workspace, in accordance with one or more implementations. Task-specific workspace 216 may include a first set of applications 218 that are accessible via task-specific workspace 216. Window 220 may correspond with one of the applications in the first set of applications 218. Task-specific workspace 216 may include a header 217. Header 217 may include task information describing task 210. Header 217 may include one or more buttons. Status button 222 may be used by the user to indicate task 210 is complete and/or incomplete, and/or trigger completion of task 210. Pause button 224 may be used to pause task 210 and/or a timer associated with task 210. Chat button 226 may be used to initiate a chat session related to task 210 and/or make a comment on task 210. Header 217 may display the due date 212 of task 210. In some implementations, header 217 may display a quantity of tasks waiting 216 (e.g., lower priority tasks and/or tasks not presently selected by the user). Header 217 may indicate what a user should be working on such that the user remains focused on task 210.

Figure 2D:
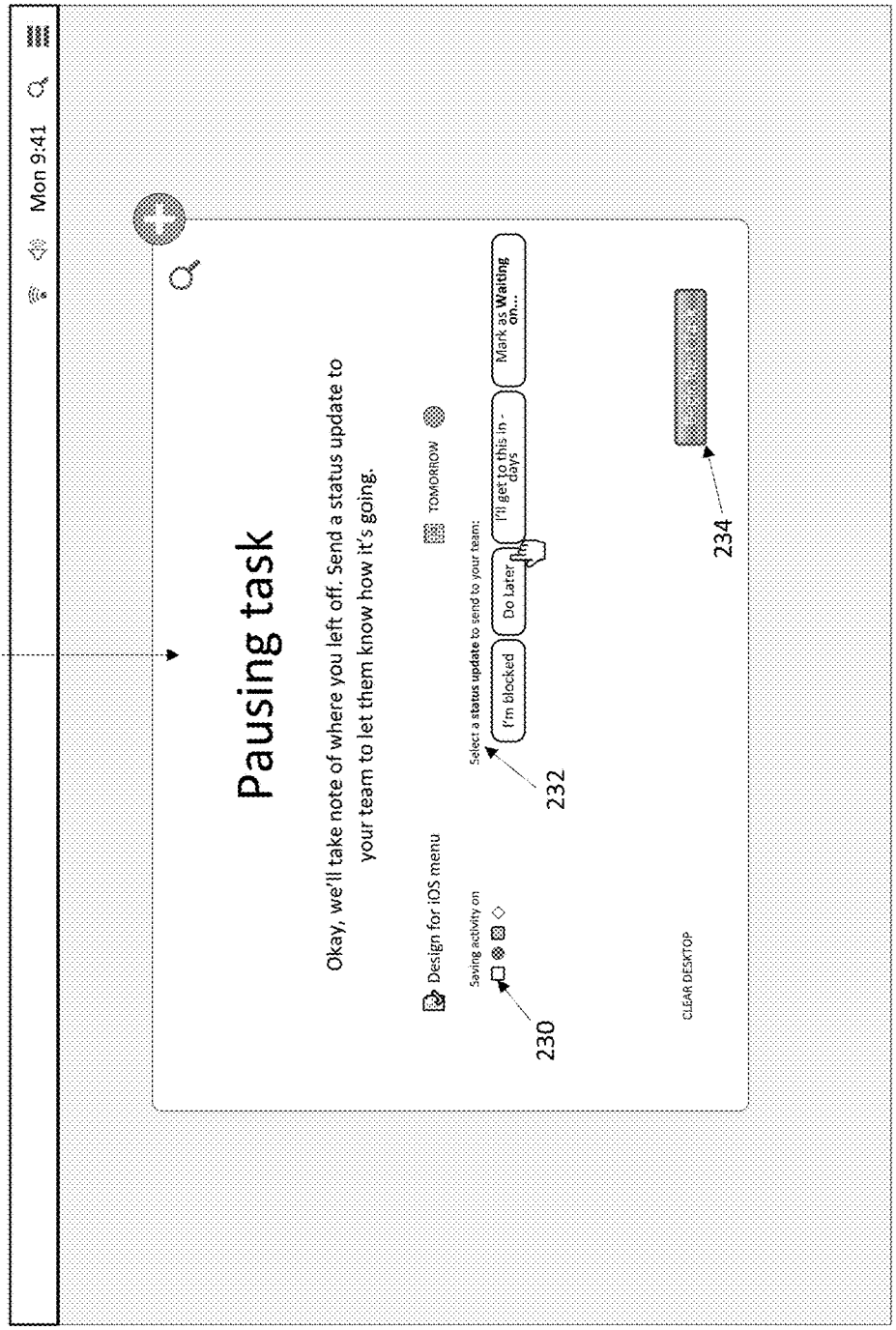
FIG. 2D illustrates an exemplary graphical user interface for pausing a task-specific workspace, in accordance with one or more implementations.

By way of non-limiting illustration, FIG. 2D illustrates an exemplary graphical user interface for pausing a task-specific workspace, in accordance with one or more implementations. Graphical user interface (GUI) 228 may be presented to the user responsive to the user selecting the pause button 224 (see e.g., FIG. 2C). In some implementations, (not pictured) GUI 228 may present an option to save and/or store the first task-specific workspace and/or the interactions of the first user with first set of applications 218 within the first task-specific workspace 216. In some implementations, GUI 228 may present a notification 230 of the interactions in the task-specific workspace it is saving. GUI 228 may include options 232 to send one or more notifications based on progress of the user in the task to one or more interested parties (e.g., followers, team members, dependent task assignees, and/or other interested parties. In some implementations, the one or more interested parties may be defined by the environment state information.

Responsive to the first user re-starting and/or re-selecting the first task, first set of applications 218 may be restored based on the environment state information. In some implementations, responsive to the first user re-starting and/or re-selecting the first task, the exemplary task-specific workspace as illustrated in FIG. 2C may be presented to the first user. As such, the individual application of first set of applications 218 and its corresponding window 220 may be restored based on the environment state information. One or more other applications in first set of applications 218 may also be restored as open, but the windows may be minimized and/or behind window 220 because the interactions of the user when the user paused the task 210 indicated the workspace state (e.g., including the application state and/or window state) illustrated in FIG. 2C.

Returning to FIG. 1, in some implementations, one or more servers 102, one or more client computing platforms 124, and/or external resource(s) 122, may be operatively linked via one or more electronic communication links. For example, such electronic communication links may be established, at least in part, via a network 132 such as the Internet and/or other networks. It will be appreciated that this is not intended to be limiting, and that the scope of this disclosure includes implementations in which one or more servers 102, one or more client computing platforms 124, and/or external resource(s) 122, may be operatively linked via some other communication media.

The external resource(s) 122 may include sources of information, external entities participating with system 100, and/or other resources. In some implementations, some or all of the functionality attributed herein to external resource(s) 122 may be provided by resources included in system 100.

The one or more servers 102 may include communication lines, or ports to enable the exchange of information with a network and/or other computing platforms. Illustration of one or more servers 102 in FIG. 1 is not intended to be limiting. One or more servers 102 may include a plurality of hardware, software, and/or firmware components operating together to provide the functionality attributed herein to one or more servers 102. For example, one or more servers 102 may be implemented by a cloud of computing platforms operating together as one or more servers 102.

Processor(s) 104 and/or processor(s) 105 may be configured to provide information processing capabilities in one or more servers 102. As such, processor(s) 104 and/or processor(s) 105 may include one or more of a digital processor, an analog processor, a digital circuit designed to process information, an analog circuit designed to process information, a state machine, and/or other mechanisms for electronically processing information. Although processor(s) 104 and/or processor(s) 105 are shown in FIG. 1 as a single entity, this is for illustrative purposes only. In some implementations, processor(s) 104 and/or processor(s) 105 may include a plurality of processing units. These processing units may be physically located within the same device, or processor(s) 104 and/or processor(s) 105 may represent processing functionality of a plurality of devices operating in coordination. The processor(s) 104 and/or processor(s) 105 may be configured to execute computer readable instruction components 108, 110, 112, 114, 116, 118, and/or other components. The processor(s) 104 and/or processor(s) 105 may be configured to execute components 108, 110, 112, 114, 116, 118, and/or other components by software; hardware; firmware; some combination of software, hardware, and/or firmware; and/or other mechanisms for configuring processing capabilities on processor(s) 104 and/or processor(s) 105.

It should be appreciated that although components 108 and/or components 110, 112, 114, 116, and/or 118 are illustrated in FIG. 1 as being co-located within a single processing unit, in implementations in which processor(s) 104 and/or processor(s) 105 include multiple processing units, one or more of components 108, 110, 112, 114, 116, and/or 118 may be located remotely from the other components. The description of the functionality provided by the different components 108, 110, 112, 114, 116, and/or 118 described herein is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 104 and/or processor(s) 105 may be configured to execute one or more additional components that may perform some or all of the functionality attributed herein to one of components 108, 110, 112, 114, 116, and/or 118.

Figure 3:
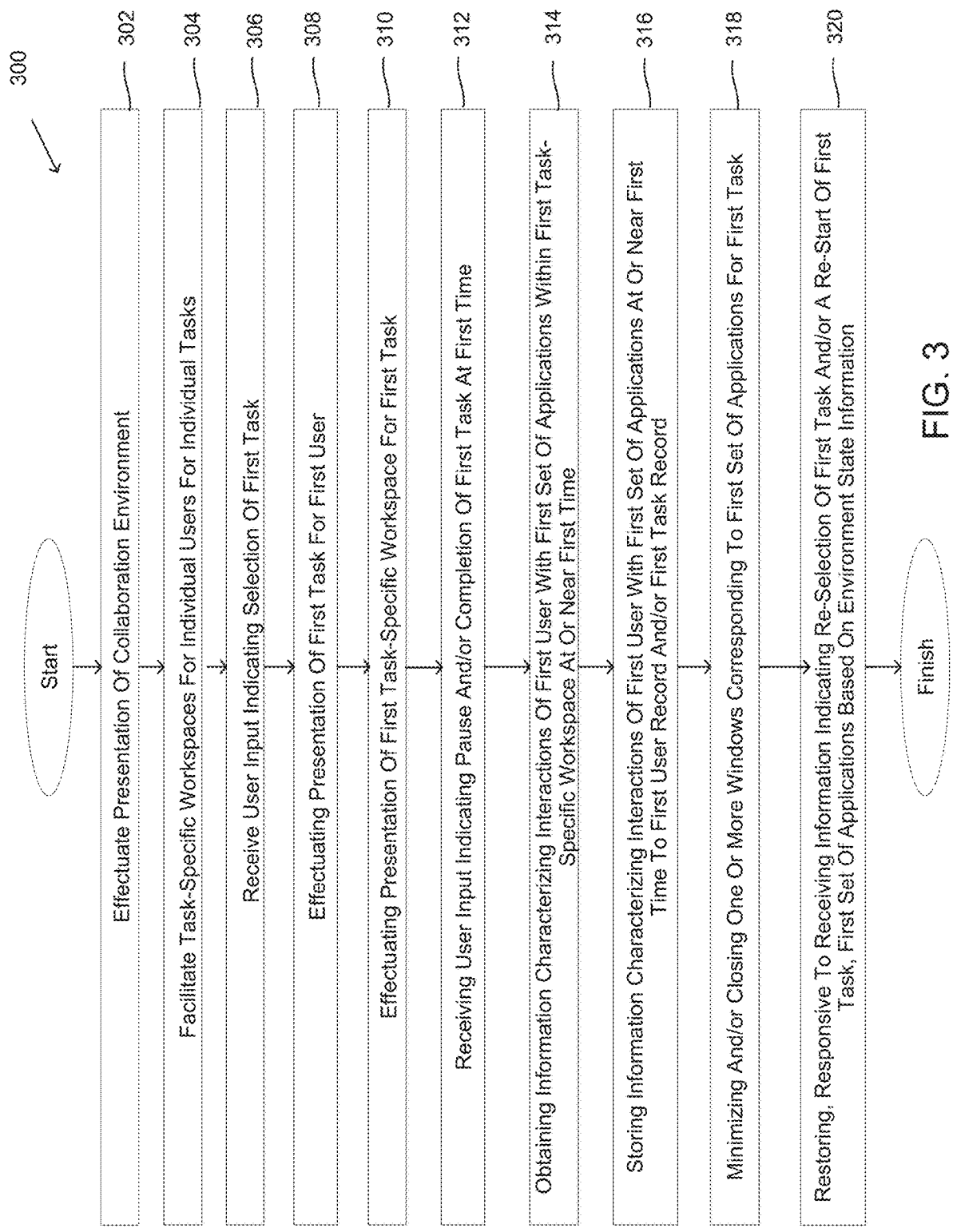
FIG. 3 illustrates a method to facilitate task-specific workspaces for a collaboration work management platform, in accordance with one or more implementations.

FIG. 3 illustrates a method 300 for facilitating task-specific workspaces for a collaboration work management platform, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, presentation of a collaboration environment may be effectuated based on environment state information. The environment state information may include user records, project records, task records, and/or other records. The environment state information may define a state of the collaboration environment. The state of the collaboration environment may include a user state, a project state, a task state, and/or other states. The user state may be defined by the user records. The user records may define values of user parameters associated with users interacting with and/or viewing the collaboration environment. The project state may be defined by the project records. The project records may define values of project parameters for projects managed within the collaboration environment. The task state may be defined by the task records. The task records may define values of task parameters for tasks created and/or assigned within the collaboration environment. In some embodiments, operation 302 is performed by a collaboration environment component the same as or similar to collaboration environment component 110 (shown in FIG. 1 and described herein).

At an operation 304, task-specific workspaces for individual ones of the users for individual ones of the tasks may be facilitated. A first task-specific workspace for a first user may be facilitated on a first client computing platform. In some embodiments, operation 304 is performed by a collaboration environment component the same as or similar to collaboration environment component 110 (shown in FIG. 1 and described herein).

At an operation 306, user input indicating selection of a first task may be received. In some embodiments, operation 306 is performed by a user task component the same as or similar to user task component 112 (shown in FIG. 1 and described herein).

At an operation 308, presentation of the first task may be effectuated for the first user based on the environment state information. In some embodiments, operation 308 is performed by a user task component the same as or similar to user task component 112 (shown in FIG. 1 and described herein).

At an operation 310, presentation of the first task-specific workspace may be effectuated for the first task. A first set of applications may be accessible via the task-specific workspace. The first set of applications may have one or more corresponding windows through which the first user interacts with the first set of applications. In some embodiments, operation 310 is performed by a workspace component the same as or similar to workspace component 116 (shown in FIG. 1 and described herein).

At an operation 312, user input indicating a pause and/or completion of the first task may be received. The pause and/or completion of the first task may be at a first time. In some embodiments, operation 312 is performed by a workspace component the same as or similar to workspace component 116 (shown in FIG. 1 and described herein).

At an operation 314, information characterizing interactions of the first user with the first set of applications within the first task-specific workspace at or near the first time may be obtained. In some embodiments, operation 314 is performed by an application component the same as or similar to application component 118 (shown in FIG. 1 and described herein).

At an operation 316, the information characterizing the interactions of the first user with the first set of applications at or near the first time may be stored. The information may be stored as part of a first user record and/or a first task record. In some embodiments, operation 316 is performed by an application component the same as or similar to application component 118 (shown in FIG. 1 and described herein).

At an operation 318, the one or more windows corresponding to the first set of applications for the first task may be minimized and/or closed. In some embodiments, operation 318 is performed by a workspace component the same as or similar to workspace component 116 (shown in FIG. 1 and described herein).

At an operation 320, the first set of applications may be restored based on the environment state information. The first set of applications may be restored responsive to receiving information indicating re-selection of the first task and/or a re-start of the first task. Such that he one or more windows corresponding to the first set of applications may be restored based on the first user record and/or the first task record. In some embodiments, operation 320 is performed by a workspace component the same as or similar to workspace component 116 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate task-specific workspaces within a collaboration environment, the system comprising:
one or more physical processors configured by machine-readable instructions to:
manage environment state information maintaining a collaboration environment, the environment state information including user records and task records, the user records including user information describing users interacting with and/or viewing the collaboration environment, the task records including task information describing tasks created within the collaboration environment and assigned within the collaboration environment to the users who are expected to accomplish one or more actions to complete the tasks;
effectuate presentation of a user interface of the collaboration environment comprising a first task-specific workspace for a first task on a first computing platform associated with a first user, wherein the first task-specific workspace presents a first set of applications via one or more windows through which the first user interacts with the first set of applications;
effectuate presentation of a list of multiple tasks previously assigned to the first user in the user interface concurrently with the first task-specific workspace;
receive information defining user input into the user interface including a selection of a second task previously assigned to the first user from the list of multiple tasks previously assigned to the first user, the user input indicating a pause of the first task;
responsive to receiving the information defining the user input into the user interface indicating the pause of the first task via the selection of the second task from the list of multiple tasks:
store interaction information characterizing interactions of the first user with the first set of applications in a first task record of the first task; and
close the one or more windows corresponding to the first set of applications; and
responsive to receiving restart information indicating a re-start of the first task, restore the first set of applications within the first task-specific workspace such that the one or more windows corresponding to the first set of applications are restored based on the first task record.

2. The system of claim 1, wherein the one or more physical processors are further configured by the machine-readable instructions to:
clear a current desktop to initiate the first task-specific workspace for the first task by minimizing and/or closing one or more other windows displayed on the current desktop.

3. The system of claim 1, wherein one or more other applications available via the first computing platform outside of the first task-specific workspace are made inaccessible within the first task-specific workspace.

4. The system of claim 3, wherein the one or more physical processors are further configured by the machine-readable instructions to:
identify the one or more other applications as being inaccessible within the first task-specific workspace based on the user records and/or the task records.

5. The system of claim 1, wherein the interaction information characterizing the interactions of the first user with the first set of applications includes progress information characterizing progress of the first user within the first set of applications and/or on the first task.

6. The system of claim 1, wherein the one or more physical processors are further configured by the machine-readable instructions to close, responsive to receiving the user input, the first task-specific workspace.

7. The system of claim 1, wherein the one or more physical processors are further configured by the machine-readable instructions to effectuate presentation of an option to save and/or store the first task-specific workspace and/or the interactions of the first user with the first set of applications within the first task-specific workspace.

8. The system of claim 1, wherein the one or more physical processors are further configured by the machine-readable instructions to effectuate presentation of an option to send a notification based on progress of the first user on the first task to one or more other ones of the users.

9. The system of claim 1, wherein the one or more physical processors are further configured by the machine-readable instructions to:
responsive to receiving the user input including the selection of the second task, effectuate presentation of a second task-specific workspace for the second task.

10. The system of claim 1, wherein the presentation of the first task-specific workspace for the first task is responsive to a selection of the first task from the list of multiple tasks previously assigned to the first user.

11. A method to facilitate task-specific workspaces within a collaboration environment, the method comprising:
managing environment state information maintaining a collaboration environment, the environment state information including user records and task records, the user records including user information describing users interacting with and/or viewing the collaboration environment, the task records including task information describing tasks created within the collaboration environment and assigned within the collaboration environment to the users who are expected to accomplish one or more actions to complete the tasks;
effectuating presentation of a user interface of the collaboration environment including a first task-specific workspace for a first task on a first computing platform associated with a first user, wherein the first task-specific workspace presents a first set of applications via one or more windows through which the first user interacts with the first set of applications;
effectuating presentation of a list of multiple tasks previously assigned to the first user in the user interface concurrently with the first task-specific workspace;
receiving information defining user input into the user interface including a selection of a second task previously assigned to the first user from a list of multiple tasks previously assigned to the first user, the user input indicating a pause of the first task;
responsive to receiving the information defining the user input into the user interface indicating the pause of the first task via the selection of the second task from the list of multiple tasks:
storing interaction information characterizing interactions of the first user with the first set of applications in a first task record of the first task; and
closing the one or more windows corresponding to the first set of applications; and
responsive to receiving restart information indicating a re-start of the first task, restoring the first set of applications within the first task-specific workspace such that the one or more windows corresponding to the first set of applications are restored based on the first task record.

12. The method of claim 11, further comprising:
clearing a current desktop to initiate the first task-specific workspace for the first task by minimizing and/or closing one or more other windows displayed on the current desktop.

13. The method of claim 11, wherein one or more other applications available via the first computing platform outside of the first task-specific workspace are made inaccessible within the first task-specific workspace.

14. The method of claim 13, further comprising:
identifying the one or more other applications as being inaccessible within the first task-specific workspace based on the user records and/or the task records.

15. The method of claim 11, wherein the interaction information characterizing the interactions of the first user with the first set of applications includes progress information characterizing progress of the first user within the first set of applications and/or on the first task.

16. The method of claim 11, further comprising closing, responsive to receiving the user input, the first task-specific workspace.

17. The method of claim 11, further comprising effectuating presentation of an option to save and/or store the first task-specific workspace and/or the interactions of the first user with the first set of applications within the first task-specific workspace.

18. The method of claim 11, further comprising effectuating presentation of an option to send a notification based on progress of the first user on the first task to one or more other ones of the users.

19. The method of claim 11, further comprising:
responsive to receiving the user input including the selection of the second task, effectuating presentation of a second task-specific workspace for the second task.

20. The method of claim 11, wherein the presentation of the first task-specific workspace for the first task is responsive to a selection of the first task from the list of multiple tasks previously assigned to the first user.

* * * * *